United States Patent [19]

Price

[11] Patent Number: 4,631,207

[45] Date of Patent: Dec. 23, 1986

[54] SILOXANE COMPOSITIONS AND PROCESS FOR TREATMENT OF MATERIALS

[75] Inventor: John G. C. Price, Barry, Wales

[73] Assignee: Dow Corning Ltd., Barry, Wales

[21] Appl. No.: 808,772

[22] Filed: Dec. 13, 1985

[30] Foreign Application Priority Data

Dec. 22, 1984 [GB] United Kingdom ............... 8432570

[51] Int. Cl.$^4$ .............................................. B05D 3/02
[52] U.S. Cl. .................................... 427/387; 428/447;
  106/287.11; 106/287.14; 106/287.16; 524/376;
  524/588; 524/762; 524/860
[58] Field of Search ............... 106/287.11, 287.16,
  106/287.14; 524/376, 588, 762, 860; 427/387;
  428/447

[56] References Cited

U.S. PATENT DOCUMENTS

| | | | |
|---|---|---|---|
| 4,501,619 | 2/1985 | Gee | 524/588 |
| 4,537,944 | 8/1985 | Imai et al. | 524/376 |

FOREIGN PATENT DOCUMENTS

| | | |
|---|---|---|
| 68671 | 5/1983 | European Pat. Off. |
| 984518 | 2/1965 | United Kingdom |
| 1199501 | 6/1970 | United Kingdom |

*Primary Examiner*—Melvyn I. Marquis
*Attorney, Agent, or Firm*—Christopher E. Blank

[57] ABSTRACT

A siloxane treating composition comprises (1) a mixture and/or a reaction product of (A) a polydiorganosiloxane having at least one silicon-bonded —OX group, X being H, alkyl or alkoxyalkyl and at least one silicon-bonded aminoalkyl or polyaminoalkyl acid salt group, and (B) a silicon compound having more than 2 silicon-bonded groups which are reactive with —OX of (A), and (2) a water-soluble solvent for (A) which comprises one or both glycol ethers of the formula $C_4H_9$—O—($CH_2$—$CH_2$—O)$_n$H where n is 1 or 2. These compositions have improved penetration ability and stability, especially when used as aqueous composition for rendering substrates, such as masonry, hydrophobic.

Also claimed is a process for making such compositions and a process for applying them to substrates.

11 Claims, No Drawings

SILOXANE COMPOSITIONS AND PROCESS FOR TREATMENT OF MATERIALS

This invention relates to novel siloxane compositions, a process for the preparation of such compositions and to the treatment of materials with such compositions.

The use of organosilicon products for rendering masonry and other substrates hyrophobic has been known and commercially practised for many years. In the case of masonry substrates the products most commonly employed are organosiloxane resins, usually in combination with catalysts and other additives. Although usually technically effective such products are normally supplied and employed as solutions in organic solvents. However, the commonly used solvents are generally inflammable and have become increasingly expensive. They also increasingly give rise to concern with regard to atmospheric pollution. There has therefore existed an increasing demand to reduce or replace entirely the known diluents with less hazardous and cheaper materials, whilst preserving the ability of the composition to penetrate porous substrates and render them hydrophobic.

Water-based materials in the form of the alkali metal siliconates have been available as masonry water repellents for many years. They are, however, strongly alkaline and the handling of such products presents certain problems. Moreover, the siliconates are not entirely suitable for certain applications. For example, when employed for the impregnation of brickwork for the purpose of forming a damp proof course therein, their slow cure rate means that they can be displaced from the injected region by high capillary flow. A further disadvantage is that the salts formed during curing of the siliconate may give rise to unsightly efflorescence on the masonry surface. It has also been proposed to provide water-based compositions containing organoalkoxy silanes. However, such silanes are inflammable, the aqueous solutions have to be prepared just prior to use and they are suitable for treating only a limited range of substrates.

Compositions which exhibit hydrophobic characteristics on transparent surfaces, such as the windscreens of aircraft and motor vehicles, and which comprise (a) isopropanol (b) water and (c) a dimethylpolysiloxane containing polyaminoalkyl groups in which the amino groups have been neutralized by reaction with an acid, have been disclosed in British Pat. No. 1 199 501. Compositions for treating surfaces to facilitate the release of ice and comprising (A) a polysiloxane having substituent polyaminoalkyl groups or (B) a monocarboxylic acid salt thereof, have been disclosed in British Pat. No. 984 518.

In European Patent Application No. 68 671, a composition is provided which comprises (A) a polydiorganosiloxane having at least one silicon-bonded —OX group wherein X represents a hydrogen atom, an alkyl group or alkoxyalkyl group, and at least one silicon-bonded substituent selected from aminoalkyl and polyaminoalkyl acid salt groups, (B) a silicon compound which is soluble in (C) and which has per molecule more than two silicon-bonded groups reactive with the —OX groups in (A) and (C) a water-soluble solvent for (A). That composition is described as useful for the treatment of substrates and especially for the treatment of masonry.

These compositions are relatively stable both as concentrates and when diluted with water and can remain in a usable condition for at least several weeks. One application of the compositions is the in situ formation of damp proof courses wherein the composition diluted with water is injected into and penetrates the masonry which is to be rendered hydrophobic. Another application is the treatment of building facades. The latter involves surface application but also requires some penetration below the masonry surface. However, it has been found that compositions as described in European Patent Application No. 68 671 when diluted with water show, after prolonged storage, a decrease in their ability to penetrate the masonry. This is especially the case where high density bricks are to be treated. We have now found that the decreasing ability to penetrate masonry can be overcome by the incorporation of certain specific water soluble solvents in such compositions.

Accordingly the present invention provides compositions which comprise (1) a mixture and/or a reaction product of (A) a polydiorganosiloxane having a molecular weight of at least 350 and at least one silicon-bonded —OX group, wherein X represents a hydrogen atom, an alkyl group or an alkoxyalkyl group, the said polydiorganosiloxane having at least one silicon-bonded substituent selected from aminoalkyl and polyaminoalkyl acid salt groups derived from a water-soluble organic or inorganic acid, at least 0.5 percent by weight of the polydiorganosiloxane being provided by amino nitrogen, at least 40 percent of the total number of silicon-bonded substituents in the polydiorganosiloxane being methyl groups and any remaining substituents being monovalent hydrocarbon groups having from 2 to 10 carbon atoms and (B) a silicon compound which is soluble in (2) and which has per molecule more than two silicon-bonded groups reactive with the —OX groups in (A) and (2) a water-soluble solvent for (A) which comprises one or both glycol ethers of the formula $C_4H_9$—O—$(CH_2$—$CH_2$—O$)_n$H, where n=1 or 2.

This invention also includes a process for preparing the compositions and further includes a process for treating substrates with the said compositions.

Polydiorganosiloxane (A) for use in compositions according to this invention is a linear or substantially linear polysiloxane having at least one silicon-bonded —OX group, wherein X represents a hydrogen atom or an alkyl or alkoxyalkyl group, preferably having less than 6 carbon atoms. Examples of the operative X groups are hydrogen, methyl, ethyl, propyl, butyl and methoxyethyl. The OX groups may be present in terminal and/or non-terminal positions in the polysiloxane chain. Preferred polydiorganosiloxane (A) has OX groups attached to terminal silicon atoms. At least 40 percent of the total number of organic substituents present in polydiorganosiloxane (A) are methyl groups. Polydiorganosiloxane (A) also has one or more silicon-bonded aminoalkyl and/or polyaminoalkyl acid salt groups which are derived from aminoalkyl and/or polyaminoalkyl groups and water-soluble organic or inorganic acids. The aminoalkyl and polyaminoalkyl groups from which the acid salt groups are derived are alkyl groups substituted with one or more primary, secondary or tertiary amino groups. Examples of such aminoalkyl and polyaminoalkyl groups are:

—$(CH_2)_3NH_2$, —$(CH_2)_4NHCH_3$, —$CH_2CH(CH_3)CH_2N(C_2H_5)_2$,

—$(CH_2)_3NHCH_2CH_2NHCH_2CH_2NH_2$ and

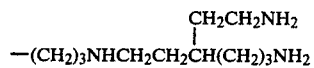

the preferred groups being —(CH$_2$)$_3$NH(CH$_2$)$_2$NH$_2$ and CH$_2$CH(CH$_3$)CH$_2$NHCH$_2$CH$_2$NH$_2$. Sufficient of the aminoalkyl and/or polyaminoalkyl acid salt groups should be present to provide at least 0.5 percent by weight of amino nitrogen in the polydiorganosiloxane. From a cost aspect it is preferable to employ the minimum amino content consistent with the desired solubility of the polydiorganosiloxane in water. It is therefore preferred that the amino nitrogen content does not exceed about 3.5 percent. Most preferably polydiorganosiloxane (A) has from 0.75 to 2.5 percent by weight amino nitrogen. Depending on the method of manufacture of polydiorganosiloxane (A) the aminoalkyl or polyaminoalkyl acid salt groups may be present at the ends of the polysiloxane chain or in non-terminal positions or attached to both terminal and non-terminal silicon atoms. Any silicon-bonded organic substituents which may be present in the polydiorganosiloxane (A) in addition to the specified methyl groups, aminoalkyl and polyaminoalkyl acid salt groups and OX groups are monovalent hydrocarbon groups having from 2 to 10 carbon atoms, such as alkyl, alkenyl, cycloalkyl, aryl, arylalkyl and alkaryl groups. The molecular weight of the polydiorganosiloxane (A) should be at least 350 and preferably lies within the range from 800 to 3000.

Polydiorganosiloxane (A) may be prepared by reacting the appropriate aminoalkyl- and/or polyaminoalkyl-substituted polydiorganosiloxane with any water-soluble organic or inorganic acid. The salt-forming acid may be mono, di- or polybasic and examples of suitable salt-forming acids include hydrochloric, hydrobromic, sulphuric, nitric, boric, phosphoric, formic, propanoic, trichloroacetic, benzenesulphonic, succinic and oxalic acids. The salt groups are, however, preferably derived from the less corrosive acids, for example acetic acid. Aminoalkyl- and/or polyaminoalkyl-substituted polydiorganosiloxanes employed in the formation of the acid salts can be prepared by known techniques, for example by reaction of a silanolterminated polydiorganosiloxane free of amino-containing substituents with a silane such as (CH$_3$)$_n$(XO)$_{3-n}$SiZ, wherein Z represents an aminoalkyl or polyaminoalkyl group, n is 0 or 1 and X is as defined hereinabove, by the polymerization of a cyclic siloxane in the presence of the said silane or by the copolymerization of aminoalkyl or polyaminoalkyl siloxanes with a polydiorganosiloxane for example polydimethylsiloxane.

As component (B) of compositions according to this invention there may be employed any organosilicon compound which is soluble in (2) and which has per molecule more than two silicon-bonded groups reactive with the —OX groups in (A). Such organosilicon compound may be a silane or siloxane having silanol groups or silicon-bonded hydrolysable atoms or groups. Examples of silicon-bonded hydrolysable atoms or groups are chlorine atoms, alkoxy and alkoxyalkoxy groups e.g. methoxy, ethoxy, propoxy, methoxyethoxy and ethoxyethoxy, acyloxy groups e.g. acetoxy groups and ketoximo groups. In addition to hydrolysable atoms and groups organosilicon compound (B) may contain siliconbonded monovalent hydrocarbon and substituted hydrocarbon groups, for example alkyl, alkenyl, aryl, haloalkyl, aminoalkyl, epoxyalkyl and mercaptoalkyl groups. Preferably component (B) is selected from silanes of the general formula RSiY$_3$ wherein R represents an alkyl, alkenyl, aryl, alkoxy or alkoxyalkoxy group and each Y represents an alkoxy or alkoxyalkoxy group, R and Y each preferably having less than 7 carbon atoms, and partial hydrolyzates and condensates of such silanes. Illustrative of the preferred silanes and partial hydrolyzates are methyltrimethoxysilane, methyltriethoxysilane, isobutyltrimethoxysilane, vinyltrimethoxysilane, propyltrimethoxysilane, phenyltriethoxysilane, vinyltris(methoxyethoxy)silane, tetraethoxysilane and ethyl polysilicate.

The solvent component (2) of the composition of this invention comprises, one or both glycol ethers of the formula $C_4H_9$—O—(CH$_2$—CH$_2$—O)$_n$—H where n=1 or 2. The preferred glycol ether is ethylene glycol mono butyl ether (i.e. where n=1), which is commercially available, for example as Dowanol ® EB from Dow Chemical. Component (2) may comprise from relatively small proportions, e.g. 1%, up to 100% by weight of the glycol ether, the preferred proportion being from 42% to 100% by weight of component (2). Other solvents which may be present in (2) include any one or more of water-soluble aliphatic alcohols, glycols, polyetherglycols, ethers or esters of glycols or polyglycols as described and exemplified in European Patent Application No. 68 671. Where economy of operation is sought it is desirable that (2) comprises a specified butyl glycol ether in combination with one or more less expensive solvents. We have found that aliphatic alcohols, especially methanol are particularly suitable as such solvent, both with regard to cost and performance. When methanol is used in conjunction with the butyl glycol ether in the water-soluble solvent (2), the proportion of methanol to the ether is preferably from 1:5 to 2:1, most preferably 1:4 to 1:2.

Compositions according to this invention may be obtained by a process which comprises simply forming a mixture of ingredients (A), (B) and (2). This may be achieved by any convenient method. For example, a polydiorganosiloxane having aminoalkyl and/or polyaminoalkyl substitutents may be pre-reacted with the organic or inorganic acid and the resulting salt then mixed with (B) and (2). Alternatively the mixture may be formed by first mixing a polydiorganosiloxane having aminoalkyl or polyaminoalkyl groups with (B) and at least sufficient of the acid to provide the desired degree of salt group formation. The solvent (2) may be incorporated at any one or more stages of the procedure. However, a more preferred process for preparation of compositions according to this invention is that wherein (A) and (B) are reacted together. We have found that compositions which are thus prepared generally exhibit better storage stability in the diluted state than compositons obtained by merely mixing (A) and (B) at ambient temperatures. Compositions according to the invention which contain a reaction product of (A) and (B) may be prepared, for example, by first reacting (B) with a polydiorganosiloxane having aminoalkyl and/or polyaminoalkyl substituents and thereafter forming the salt groups by addition of the acid. More preferably the preformed salt of the polydiorganosiloxane is reacted directly with the organosilicon compound (B). Reaction between (B) and the polydiorganosiloxane can be brought about by exposing a mixture of the two to elevated temperatures. Heating the mixture at temperatures in the range from about 40° C. to 110°

C. for about 15 minutes to about 3 hours is generally adequate. The mixture may, however, be heated up to temperatures of about 150° C. Preferably the by-product alcohol is subsequently removed from the reacted mixture by distillation. To avoid the risk of premature gelation the reaction involving the polydiorganosiloxane and (B) is best carried out in the presence of at least a portion of the solvent (2). Depending on the desired dilution of the product excess solvent may subsequently be removed or more solvent added.

Component (B) may be employed in a wide range of proportions depending for example on the particular organosilicon compound used and the rate of cure and degree of hardness desired in the product after application. For most applications it is preferred to use from about 5 to 50 percent by weight of (B) based on the weight of (A).

Sufficient of the solvent (2) should be present to provide a homogeneous composition having the desired storage stability. Although the proportion of (2) may vary widely, e.g. from 20 to 500 percent by weight based on the weight of (A), it is preferred to employ from about 50 to 400 percent by weight of (2) based on the weight of (A).

In addition to components (1) and (2) compositions according to this invention preferably also contain some free organic or inorganic acid. The acid may be incorporated by any convenient procedure, for example by the use of a stoichiometric excess of acid during the preparation of the salt, by separate addition or by addition of the acid in admixture with the other components of the composition. We have found that the presence of the acid can prolong the useful working life of the compositions in diluted form, for example when the compositions are diluted with water and stored prior to use. The proportion of acid required to achieve the desired advantage may, depending on the nature of the acid and the diluted composition, vary from a trace to 10 percent or more by weight based on the weight of (A). For optimum results it is preferred to employ sufficient acid to provide for a pH of not greater than 7 for the composition when diluted with water. The free acid, when employed, may be the same as the acid of the polydiorganosiloxane salt group or it may be different.

Compositions according to the invention can remain in a stable condition prior to dilution for at least several months. They may be diluted with water and the diluted solution remains in a usable condition for at least several months. Preferably the amount of the dilution water is from about 4 to about 300 percent by weight based on the weight of (A).

Compositions according to this invention are film forming and are useful for forming protective and/or water repellent coatings on a variety of substrates to which they may be applied as single or multiple coatings. Examples of such substrates are metal, wood, paper, textiles, leather and ceramics. However, they are particularly suitable as aqueous-based water repellents for both siliceous and nonsiliceous masonry. They are miscible with water and may be diluted therewith for application to bricks (both high density and low density bricks), mortar, limestone and other masonry substrates, including particulate forms such as perlite and vermiculite, either for the in situ formation of damp-proof courses or as surface treatments. When employed as masonry water repellents the compositions are preferably diluted to provide a treating solution containing from about 2 to about 10 percent of component (1) by weight.

If desired, catalysts may be included in compositions according to this invention to accelerate the curing thereof. The preferred catalysts are the water-miscible or water-dispersible metal organic compounds, for example triethanolamine titanate, octylene glycol titanate and diisopropoxytitanium di(acetylacetonate). The catalyst may be added either prior to or subsequent to the dilution of the composition with water and may be employed in amounts conventional for siloxane catalysis, preferably from 0.1 to 10 percent weight based on weight of component (1).

The following examples, in which the parts are expressed by weight, illustrate the invention.

EXAMPLE 1

Octamethylcyclotetrasiloxane (150 g) was added to a 500 ml three necked glass flask together with N-(2-aminoethyl)-3-aminopropyldimethoxymethyl silane (27.8 g) and tetramethylammonium silanolate (22.0 g). The flask was then heated to 100° C. for 2 hours and the silanolate catalyst thermally decomposed by raising the temperature to about 150° C. for 30 minutes. The reaction mixture was then allowed to cool to 50° C. and glacial acetic acid (16.2 g) added to form the amine acetate salt of the siloxane polymer (Mn approximately 1500). When cool the siloxane salt was mixed with isopropyl alcohol (150 g) and methyl trimethoxysilane (10 g) to give a clear solution having a viscosity of 8 $10^{-6}$ m$^2$/s at 25° C.

After storage of ten months at room temperature in a closed container, this solution was divided into several parts. The first part (Part A) was diluted with isopropyl alcohol to a solids content of 30%, the second part (Part B) was diluted with ethylene glycol monoethyl ether to a solids content of 30%, the third part (Part C) was diluted with butyl Cellosolve ® (ethylene glycol monobutyl ether) to a solids content of 30% and the fourth part (Part D) was diluted with diethylene glycol monobutylether to a solids content of 30%. Parts A, B, C and D were then further diluted to 4% solids content level with water. To check the impregnation ability (or wettability) of these solutions 1 ml aliquots of the 4% solutions were placed on the smooth back surface of Ibstock Red rustic bricks. The time taken for each of these droplets to become totally absorbed by the brick was measured. The solution made with Part A required 6 minutes to be absorbed, the solution made with Part B required 13 minutes while the solution prepared from part C was absorbed in less than one minute. The solution prepared from part D was fully absorbed after 1.4 minutes.

EXAMPLE 2

Octamethylcyclotetrasiloxane (17.63 parts) was added to a glass flask, together with N-(2-aminoethyl)-3-aminopropyltrimethoxysilane (3.5 parts) and tetramethylammonium silanolate (2.62 parts). The flask was then heated to 100° C. for 2 hours after which the temperature was raised to about 150° C. and the pressure reduced for 30 minutes, to decompose the silanolate and remove methanol. The reaction mixture was then allowed to cool to below 100° C. To 35 parts of the cooled reaction mixture were added 15 parts of methyltrimethoxysilane, 5 parts of water and 45 parts of butyl cellosolve ®, together with 5.5 parts of glacial acetic acid, to form the amine acetate salt of the reaction product. The mixture was refluxed at 90° C. for 3 hours and allowed to cool down.

A part of the reaction mixture (Part A) was diluted with 67 parts of butyl cellosolve ® to give a solution with 30% solids (Solution A) and another part (Part B) was diluted with 67 parts of methanol to give another solution with 30% solids (Solution B). Solutions A and B were then diluted to 4% solids with water. Concrete blocks of 50 mm×50 mm×25 mm were made according to German Specification No. DIN 18-540. The block was divided into four concentric square areas of respectively 400, 900, 1600 and 2500 mm² for easy measurement of the extent of spreading. Using a 145 mm Pasteur Pipette, 30 drops of Solution A were placed on a block and 30 drops of Solution B were placed on a separate block. The solution was allowed to spread for 120 seconds and the area covered was noted. Solution A had covered 2000 mm² and Solution B 1200 mm². Both results are within acceptable range.

EXAMPLE 3

Octamethylcyclotetrasiloxane (1110 g) was added to a glass flask together with N(2-aminoethyl)-3-aminopropyldimethoxymethylsilane (222 g) and tetramethylammonium silanolate (165 g). The mixture was then heated to 110° C. for 2 hours and the silanolate catalyst thermally decomposed by raising the temperature to 140° C. for 1 hour. The reaction mixture was then allowed to cool to room temperature and glacial acetic acid (144 g) added to form the amine acetate salt of the siloxane polymer. The siloxane salt was then mixed with methyltrimethyoxysilane (681 g), ethylene glycol monobutylether (2846 g) and H₂O (227 g). The mixture was heated to above 100° C. and the pressure reduced to remove methanol. After cooling, this mixture (50% solids-active ingredients) was diluted with methanol (1214 g) and ethylene glycol monobutylether (712 g) to reduce the solids content to 35%. Further acetic acid (60 g) was then added.

The mixture obtained as described above was diluted with water to 4% solids and then tested according to British Standard Specification for water repellents for masonry surfaces, BS6477: 1984, Appendices D.4, E and F. The results of these tests were as follows:

| D.4 | solution weight pickup | 9.2 g |
| | minimum expected pickup | 6.0 g |
| E | the pool of water remains on top of the treated surface for longer than the required time (10 mins.) | |
| F | relative water absorption | 2.2% |
| | maximum allowed water absorption | 10.0% |

It is clear from these results that masonry treated with a composition according to the invention exhibits good water repellency.

EXAMPLE 4

A masonry surface was treated with the diluted composition (4% solids) of Example 3 and left to air dry and cure at room temperature for three days. Then the masonry surface was recoated with the same diluted composition and complete wetting was observed.

That which is claimed is:

1. Compositions comprising (1) a component selected from the group consisting of mixtures and reaction products of (A), a polydiorganosiloxane having a molecular weight of at least 350 and at least one silicon-bonded —OX group, wherein X represents a group selected from a hydrogen atom, an alkyl group or an alkoxyalkyl group, the said polydiorganosiloxane having at least one silicon-bonded substituent selected from aminoalkyl and polyaminoalkyl acid salt groups derived from a water-soluble organic or inorganic acid, at least 0.5% by weight of the polydiorganosiloxane being provided by amino nitrogen, at least 40% of the total number of silicon-bonded substituents in the polydiorganosiloxane being methyl groups and any remaining substituents being monovalent hydrocarbon groups having from 2 to 10 carbon atoms, and (B) a silicon compound which is soluble in (2) and which has per molecule more than 2 silicon-bonded groups reactive with the —OX groups in (A), and (2) a water-soluble solvent for (A) which comprises at least one glycol ether of the formula $C_4H_9$—O—$(CH_2$—$CH_2$—O$)_n$H, where n has a value of 1 or 2.

2. A composition according to claim 1 wherein the water-soluble solvent also comprises methanol in a weight ratio methanol to glycol ether of from 1:2 to 1:4.

3. A composition according to claim 1 wherein polydiorganosiloxane (A) has a molecular weight within the range from 800 to 3000, from 0.75 to 2.5% by weight of amino nitrogen and the —OX groups in (A) are attached to terminal silicon atoms.

4. A composition according to claim 1 wherein the polyaminoalkyl group of the polyorganosiloxane (A), from which an acid group is derived, is selected from the group of polyaminoalkyl radicals consisting of —$(CH_2)_3NH(CH_2)_2NH_2$ and —$CH_2CH(CH_3)CH_2NH(CH_2)_2NH_2$.

5. A composition according to claim 1 wherein (B) is a silane, a partial hydrolyzate of said silane, or a condensate of said silane, wherein said silane is of the general formula $RSiY_3$, in which R denotes alkyl, alkenyl, aryl, alkoxy, or alkoxyalkoxy groups and Y denotes alkoxy or alkoxyalkoxy groups, R and Y each having less than 7 carbon atoms.

6. A composition according to claim 1 which also comprises free organic or inorganic acid.

7. A composition according to claim 1 which also comprises water.

8. A process for the preparation of compositions of the kind claimed in claim 1 wherein a mixture of polydiorganosiloxane (A) and silicon compound (B) is heated in the presence of water-soluble solvent (2) to an elevated temperature, (A), (B) and (2) being as defined in claim 1.

9. A process according to claim 8 wherein polydiorganosiloxane (A) has a molecular weight within the range from 800 to 3000, from 0.75 to 2.5% by weight of amino nitrogen and the —OX groups in (A) are attached to terminal silicon atoms.

10. A process for rendering a substrate hydrophobic which comprises applying thereto a composition of the kind claimed in claim 1.

11. A process according to claim 10 wherein the substrate is masonry.

* * * * *